US012795789B2

(12) United States Patent
Kangarakis

(10) Patent No.: US 12,795,789 B2
(45) Date of Patent: Nov. 10, 2026

(54) ADJUSTED DIMMING OF LED LIGHTS IN A PASSENGER CABIN

(71) Applicant: Diehl Aerospace GmbH, Ueberlingen (DE)

(72) Inventor: Nicolaus Kangarakis, Nuremberg (DE)

(73) Assignee: DIEHL AEROSPACE GMBH, Ueberlingen (DE)

(*) Notice: Subject to any disclaimer, the term of this patent is extended or adjusted under 35 U.S.C. 154(b) by 205 days.

(21) Appl. No.: 18/646,041

(22) Filed: Apr. 25, 2024

(65) Prior Publication Data

US 2024/0365445 A1 Oct. 31, 2024

(30) Foreign Application Priority Data

Apr. 26, 2023 (DE) ......................... 102023110653.8

(51) Int. Cl.
*H05B 45/10* (2020.01)
*B60Q 3/43* (2017.01)
(Continued)

(52) U.S. Cl.
CPC ............... *H05B 45/10* (2020.01); *B60Q 3/43* (2017.02); *B60Q 3/47* (2017.02); *B64D 47/02* (2013.01); *H05B 45/325* (2020.01); *H05B 45/34* (2020.01)

(58) Field of Classification Search
CPC ...... H05B 45/10; H05B 45/34; H05B 45/325; B60Q 3/43; B60Q 3/47; B64D 47/02
See application file for complete search history.

(56) References Cited

U.S. PATENT DOCUMENTS 10,159,124 B2 * 12/2018 Trinschek .............. H05B 45/10
2019/0069369 A1 * 2/2019 Schevardo ............. H05B 47/18

FOREIGN PATENT DOCUMENTS

DE 102015010918 A1 * 2/2017 ............ H05B 45/20

OTHER PUBLICATIONS

Machine translation of DE-102015010918-A1. (Year: 2017).*

* cited by examiner

*Primary Examiner* — Alexander H Taningco
*Assistant Examiner* — Pedro C Fernandez
(74) *Attorney, Agent, or Firm* — Scully, Scott, Murphy & Presser, P.C.

(57) ABSTRACT

In a luminaire (10*a*, *b*) for a passenger cabin (2) of a passenger aircraft (4),
comprising at least one LED (18*a-f*) having an operating parameter (B), with the LED (18*a-f*) being able to be dimmed based on a change in said operating parameter, wherein each of the LEDs (18*a-f*) is assigned a minimum value (Ma-f) of the operating parameter (B) from which the LED (18*a-f*) lights up,
comprising a control input (16) for receiving an as-intended control signal (14) for the luminaire,
wherein the control signal (14) has, in addition to a switch-off value (A), at least two different dimming values (D1, 2) as control values(S), which correspond to respective different brightnesses (H1, 2) of the LEDs (18*a-f*),
comprising a control unit (22) containing an assignment rule (24) for the LEDs (18*a-f*), wherein each of the control values (S) is assigned a specific value of the operating parameter (B) of each of the LEDs (18*a-f*) based on the assignment rule (24),
the assignment rule (24) is calculated such that the minimum value (Ma-f) of the operating parameter (B)
(Continued)

for each of the LEDs (18*a-f*) is at least reached for each of the dimming values (D1, 2).

A luminaire arrangement (6) for a passenger cabin (2) of a passenger aircraft (4) comprising at least one luminaire (10*a, b*) contains a light control system (8) connected to the control input (16) and set up to generate the as-intended control signal (14).

13 Claims, 2 Drawing Sheets

(51) Int. Cl.

| | |
|---|---|
| ***B60Q 3/47*** | (2017.01) |
| ***B64D 47/02*** | (2006.01) |
| ***H05B 45/325*** | (2020.01) |
| ***H05B 45/34*** | (2020.01) |

ADJUSTED DIMMING OF LED LIGHTS IN A PASSENGER CABIN

BACKGROUND OF THE INVENTION

The present invention relates to LED luminaires for passenger cabins of passenger aircraft.

DISCUSSION OF THE PRIOR ART

It is known from practice to design luminaires for passenger cabins of passenger aircraft using LED (light-emitting diode) technology. There is a desire to dim such luminaires as required, that is to say to operate them with different brightnesses of the light emitted by the luminaires. In this case, the light-emitting diodes themselves, that is to say individual light-emitting diodes, are to be dimmed individually.

SUMMARY OF THE INVENTION

The present invention is directed to improvements with regard to the dimming of such LED luminaires containing at least one self-dimming light-emitting diode. More specifically, the present invention is directed to a luminaire for a passenger cabin of a passenger aircraft, comprising: at least one LED having an operating parameter (B), with the LED being able to be dimmed based on a change in said operating parameter, wherein each of the LEDs is assigned a minimum value (Ma-f) of the operating parameter (B) from which the LED lights up; a control input for receiving an as-intended control signal for the luminaire, wherein the control signal has, in addition to a switch-off value (A), at least two different dimming values (D1, 2) as control values(S), which correspond to respective different brightnesses (H1, 2) of the LEDs; and a control unit containing an assignment rule for the LEDs, wherein each of the control values(S) is assigned a specific value of the operating parameter (B) of each of the LEDs based on the assignment rule, wherein the assignment rule is calculated such that the minimum value (Ma-f) of the operating parameter (B) for each of the LEDs is at least reached for each of the dimming values (D1, 2).

The luminaire is one for a passenger cabin of a passenger aircraft. The luminaire contains at least one LED. The LED has an operating parameter. Such an operating parameter is, for example, the voltage currently applied to the light-emitting diode, the current flowing through the light-emitting diodes, the power converted at the light-emitting diode, a PWM clock rate at which the LED is supplied with an electrical power, etc. The LED and thus also the luminaire can be dimmed based on the change in the operating parameter. For example, it may be dimmed to be darker by gradually reducing the voltage applied to the LED.

The LED or each of the LEDs is assigned a minimum value of the operating parameter or has a minimum value. The LED only lights up from this minimum value. For values of the operating parameters below the minimum value, the LED thus remains permanently dark. "Light up/dark" is to be understood here as meaning that the LED emits optically perceptible light, which is therefore perceptible, for example, by passengers in the passenger cabin. In this case, only indirectly perceptible light of an LED can also be activated optically if it emits, for example, invisible UV light, which is then converted to visible light only by means of another element (diffuser, filter, etc.). It is therefore crucial that the LED and thus the luminaire only fulfil their lighting purpose when the operating parameter has a value equal to or higher than the minimum value.

The luminaire contains a control input. This is used or is set up to receive an as-intended control signal for the luminaire. "As-intended" means that the luminaire is adapted in terms of its structure to a specific control signal or a specific type of control signal and is set up for use there, for example is designed for the signal, timing, system conditions determined as a result, etc. In other words, a relevant control signal in particular is assumed to be known in terms of its signal characteristics, etc. Specifically, certain properties of the control signal are assumed as follows. In other words, only control signals which are configured as described below are considered within the scope of the invention. This does not rule out the fact that the luminaire can also be operated using other control signals. However, the invention may be useless for this purpose, for example if the control signal is only used to switch the luminaire on or otherwise off-without dimming it-only at "full" brightness.

In the following text, it is assumed that the control signal has or may have, in addition to a switch-off value, at least two different dimming values. As soon as the control signal takes on the switch-off value, the LED should be switched off in the above sense, that is to say should not emit any light. The dimming values, on the other hand, correspond to respective different "real" (setpoint) brightnesses (not equal to zero, that is to say actual "light") of the LED or luminaire. For each of the dimming values, the LED should therefore light up reliably and with a specific setpoint brightness. This brightness does not necessarily have to be fixed; the only decisive factor is that the LED actually emits light and specifically it is not dark.

The luminaire furthermore contains a control unit. The control unit contains an assignment rule for the LED or LEDs in question here. Each of the control values is assigned a specific value of the operating parameter of the LED based on the assignment rule. During operation of the luminaire which is controlled by the control signal, the light-emitting diode is then operated with the operating parameter of the value that is assigned to the associated control value via the assignment rule. The assignment rule is calculated such that the minimum value of the operating parameter for each of the LEDs is at least reached for each of the dimming values.

Therefore, for each of the LEDs in question of the luminaire, it is ensured that the minimum value of the value of the operating parameter is reached for any desired dimming value, that is to say the LED actually emits light and is not "accidentally" switched to dark, although it is activated with a dimming value, and according to this should actually produce a certain brightness. Therefore, according to the invention, the minimum value for each such LED in the luminaire is taken into account individually. "Each of the LEDs" is to be understood here as meaning that it is a single consideration and not all LEDs should be considered as a collective in general. This means that all of the LEDs that are supposed to light up based on the dimming value also actually light up and do not remain dark incorrectly, because the associated control value leads via the assignment rule to a value of the operating parameter that is below the minimum value. However, not all of the LEDs of a luminaire need to light up at a certain dimming value. For example, if an RGB luminaire (red-green-blue: the luminaire then contains both red and green and blue light-emitting diodes) is intended to generate red light at a certain dimming value, it is ensured according to the invention that the red LEDs also actually light up reliably, but the green and blue LEDs are then switched off as intended at this "red dimming value" (switch-off value).

According to the invention, in particular the so-called threshold voltage (threshold voltage, forward voltage, etc.) of LEDs are taken into account as the minimum value, in particular this is specifically determined or taken into account for the invention respectively for an LED of interest. In particular, the "switch-on threshold" for LEDs is determined and stored in the memory of a controller (control unit) or in a memory assigned to the control unit; see below. The switch-on threshold is in particular the minimum voltage of an LED from which it starts to light up (noticeably).

The invention is based on the idea that the dimming of a luminaire containing the LEDs in question should take place as gently as possible and without jerking. LEDs should actually light up or the LED should actually start to light up as early as at the first or lowest dimming value (dimming value that corresponds to the lowest/darkest luminosity of the LED lighting up).

The invention is based on the observation that, without taking such minimum values into account, it may be that a luminaire is activated using a dimming value, but the operating parameters applied to the light-emitting diode are below the minimum value and the LED actually remains dark, although its dimmed luminescence would be desirable. In other words, when dimming a luminaire in an aeroplane, the light-emitting diode will either turn on too early or too late.

According to the invention, in particular, the switch-on threshold of an LED is determined visually or using a measuring device and then taken into account accordingly in the assignment rule, for example adopted in a non-volatile memory. The software (control unit or assignment rule) then adopts or takes into account the specific value from the memory, for example in the form of a correction value; see below.

According to the invention, the advantage is that the correspondingly considered LED also actually lights up when applying each dimming value and does not light up incorrectly, that is to say it would turn on too early or too late. In other words, thanks to the invention, the LEDs of one or more luminaires no longer operate "at random".

The luminaire may contain several of the LEDs in question, that is to say those for which the minimum value is always reached with a corresponding dimming value. All of the LEDs of the luminaire can also be taken into account accordingly. As an alternative, however, the luminaire may also contain additional LEDs for which minimum values are not taken into account. However, these are not considered further within the scope of the invention. For such LEDs, for example, no correction values are available (see below) or are not taken into account, or the LEDs are not controlled at all via the assignment rule or are not controlled at all by the control unit.

In a preferred embodiment, the assignment rule is stored in the luminaire so as to be able to be changed in such a way that the assignment rule can be adapted to different, that is to say also individual, adapted, specific, changed minimum values. In other words, the minimum value for at least one of the LEDs can be input, adjusted or changed. In particular, for respective LEDs or respective LED groups, a minimum value adapted to these LEDs can be stored or taken into account individually in the assignment rule and can also be changed if necessary. This allows, for example, the dimming value with the lowest brightness to be adapted to exactly the respective minimum value for one, several or all LEDs. As a result of this, the LED in question lights up reliably at the lowest dimming value, but with the lowest possible luminosity emitted/desired by it. In other words, the "darkest possible" illumination in the passenger cabin can be implemented.

In a preferred embodiment, the control signal is a PWM signal. Such control signals are widely used in passenger cabins for illumination or lighting. The luminaire according to the invention can therefore also be integrated into existing passenger cabins or passenger cabin concepts.

In a preferred embodiment, the operating parameter is a supply voltage for the LED. The minimum value is then a voltage value, in particular the respective aforementioned threshold voltage of the LED, from which the diode allows an appreciable operating current to pass through or actually lights up noticeably.

In a preferred embodiment, the luminaire contains a memory. The memory contains a correction value for the (one, several or all) LED(s), said correction value being taken into account in the assignment rule. At least the memory contains a memory location where the correction value can be stored/introduced. In particular, the correction value is determined individually for the respective LED (an individual one, individually for a specific LED group or individually for all of the LEDs of the luminaire). The correction value is calculated in conjunction with the (remaining, since the correction value effectively constitutes a part of the assignment rule) assignment rule in such a way that the minimum value of the operating parameter for the LED is at least reached for each of the dimming values.

The term "memory" is understood broadly here. This refers to any means used to introduce an adjustable value into the assignment rule and so it may also be a value at a certain point in a sequence program of a processor that is involved in the evaluation of the assignment rule. A dedicated memory in the conventional sense purely for the purpose of the correction value therefore does not have to be available.

The correction value may be taken directly into account internally in the assignment rule, but may also be taken into account in the assignment rule in the sense of pre-processing or post-processing of a constant rule (see below). For example, the correction value may be an additive or multiplicative value for an intermediate result of a fixed part of the assignment rule. Correction values may also be such that no actual correction of any other assignment rule is made, for example an additive zero or a multiplicative one.

This makes it possible to particularly easily adapt a luminaire to specific minimum values of the LEDs currently installed in the luminaire by changing the correction values in the memory.

In a preferred variant of this embodiment, a correction value is present in the memory for all of the LEDs of the luminaire. Each of the LEDs can thus be precisely adjusted in terms of their minimum value.

In a preferred variant of this embodiment, the memory is a non-volatile memory. The correction values therefore remain permanently present in the luminaire, even when it is not supplied with electrical power. For example, the luminaire may be configured with correction values at the end of the production/manufacturing thereof and before delivery/installation in a passenger cabin.

In a preferred variant of this embodiment, the assignment rule contains a constant rule and a multiplicative or additive correction rule upstream or downstream of the constant rule. In other words, the input or output value for the constant rule is corrected when necessary. The correction value is then an additive correction offset or a multiplicative correction factor for the constant rule or the input or output value/variable thereof. In particular, the correction offset is greater than or equal to zero and the correction factor is greater than or equal to one.

For example, the operating parameter is an operating voltage and the correction value is a positive additive voltage offset or correction factor greater than or equal to one for the operating voltage. In other words, a basic value for the supply voltage is first determined according to an unchangeable core part of the assignment rule (constant rule) and this is then kept the same or increased by the voltage offset/correction factor—or, in an alternative embodiment, is also reduced if necessary (smaller than zero, smaller than one).

In a preferred variant of this embodiment, the correction value is constant for at least two, in particular several or all, of the dimming values. In particular, said correction value is only adapted to the lowest or darkest dimming value in order to reliably control the LED with the lowest possible brightness. For the remaining dimming values, that is to say brighter dimming values, the correction value does not usually have a noticeable influence on the brightness of the LED in question, which is why the correction is insignificant here. According to this embodiment, however, the integration of the correction values is particularly simple, since only one single correction value has to be provided for all dimming values per LED or for one LED group or all LEDs.

In a preferred embodiment, the assignment rule is calculated such that the minimum value is just reached at the ("darkest") dimming value, which corresponds to the lowest brightness of the LED. In other words, the switch-on threshold of the LED is just exceeded or reached, such that it lights up at the darkest dimming value reliably but with the lowest possible/desired brightness.

In a preferred embodiment, the luminaire contains LEDs of different light colours. The present invention is thus also suitable for multicoloured luminaires.

In a preferred variant of this embodiment, the assignment rule is consistent for all of the LEDs of the same light colour. It is assumed here that at least LEDs of the same light colour—for example, all red LEDs and all green LEDs—each have the same electrical characteristics or switch-on characteristics and thus have the same minimum values of their operating parameters. Therefore, only a respective individual correction is necessary for each colour group of LEDs or, according to the above embodiment, only a single correction value is necessary per colour or colour channel of the luminaire/luminaires. In other words, in particular, the correction value for one or each of the LEDs is individually determined in that it is determined consistently for all LEDs of the luminaire of the same light colour. As an alternative, the assignment rule may be selected in each case equally not only for one luminaire, but also for several luminaires or for all LEDs from a particular supplier from a particular supply of a particular production output, etc. and may then only be adapted again if changes in the behaviour of the respective LEDs are to be expected or are detected or specified.

In a preferred embodiment, the assignment rule is determined by means of a visual test representative of the LED or by means of a measuring device. In particular, at least one of the correction values is determined in this way. This makes it possible to ensure that the assignment rule or the minimum value is determined correctly, that is to say that the desired effect occurs and the LED lights up reliably and to the desired extent even at the lowest or darkest dimming value.

The present invention is further directed to a luminaire arrangement for a passenger cabin of a passenger aircraft, comprising at least one luminaire in accordance with the present invention and a light control system connected to the control input and set up to generate the as-intended control signal. The light control system is set up to generate the as-intended control signal. The control signal or the characteristic thereof is therefore known in the luminaire arrangement. The luminaire may thus be adapted to the specific control signal with regard to the assignment rule and minimum values.

The luminaire arrangement and at least some of the possible embodiments thereof and the respective advantages have already been explained analogously in connection with the luminaire according to the invention.

BRIEF DESCRIPTION OF THE DRAWINGS

Further features, effects and advantages of the invention become apparent from the following description of one preferred exemplary embodiment of the invention and the appended figures. In this case, in each case in a basic schematic diagram.

DETAILED DESCRIPTION OF THE INVENTION

Figure 1:
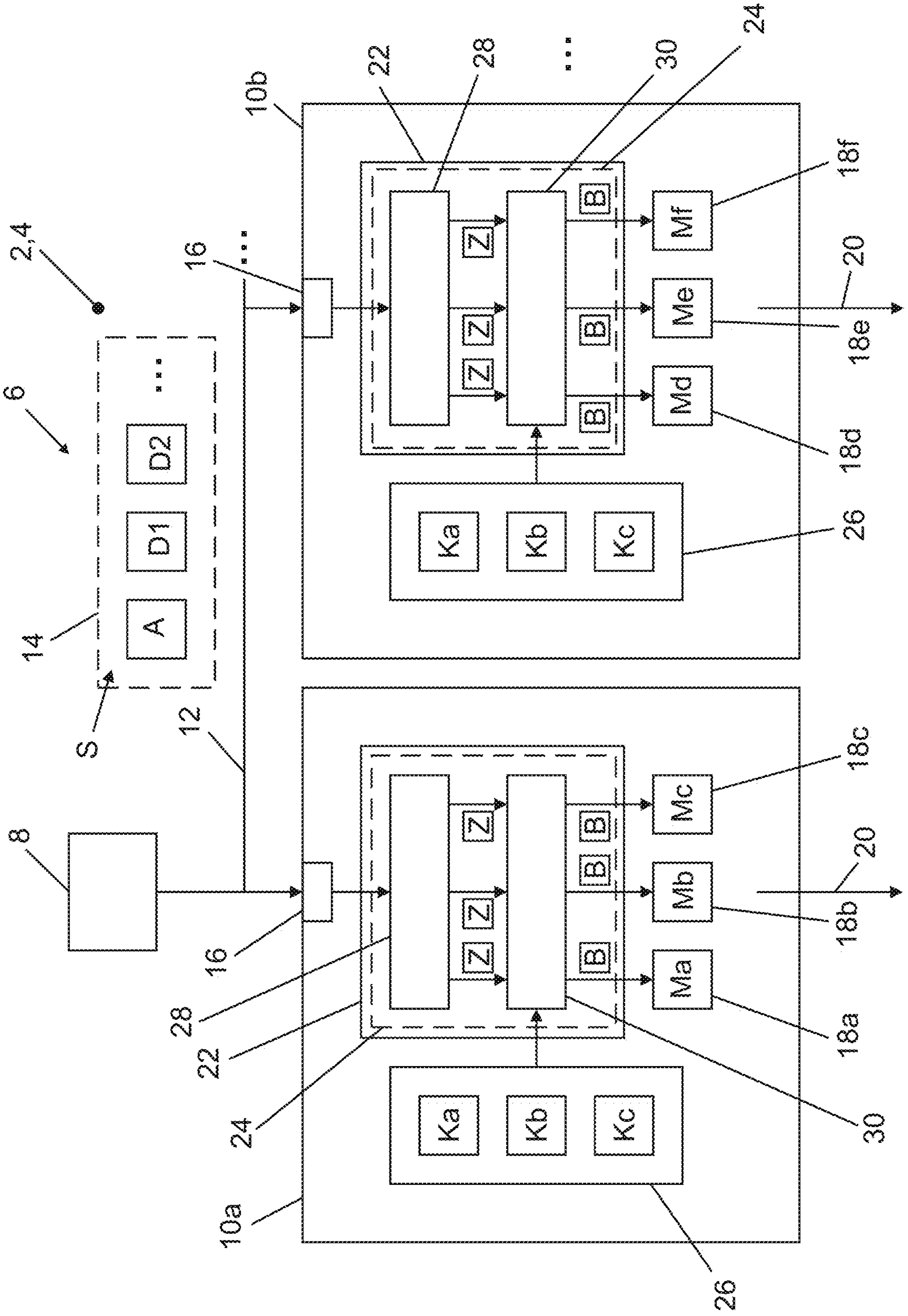
FIG. 1 shows a schematic structure of a passenger cabin of a passenger aircraft with luminaires with LEDs.

FIG. 1 shows a merely symbolically represented section of a passenger cabin 2 of a passenger aircraft 4, specifically a luminaire arrangement 6 installed in the passenger cabin 2. The luminaire arrangement 6 is used to illuminate the passenger cabin 2 variably with light of different brightness H1, 2 and different light colours. The luminaire arrangement 6 therefore contains a light control system 8 and a plurality of luminaires 10, all of which are controlled by the light control system 8 via a control line 12. FIG. 1 shows only two of the luminaires 10*a, b* by way of example.

The light control system 8 is set up to generate a control signal 14 which is then transmitted via the control line 12 to all of the luminaires 10. Each of the luminaires 10 has a control input 16. The light control unit 8 is connected to the respective control input 16 via the control line 12. Each of the luminaires 10 may thus receive the control signal 14. In the following text, the invention is only explained using the luminaires 10*a, b* as an example for all of the luminaires 10.

The luminaires 10 are therefore luminaires for the passenger cabin 2 of the passenger aircraft 4. Each of the luminaires 10 contains a plurality of LEDs 18. The LEDs 18*a-c* and 18*d-f* are shown in the luminaires 10*a, b* as examples thereof. Since the luminaires 10 are RGB multicolour luminaires, the LEDs 18*a, d* are red, the LEDs 18*b, e* are green and the LEDs 18*c, f* are blue LEDs. Each of the LEDs 18*a-f* has a respective operating parameter B, in this case an operating voltage which currently drops across or is applied via the two connections of the respective LED 18*a-f*, which are not shown in any more detail. The operating parameter B is therefore a supply voltage for the respective LED 18*a-f*. By changing the operating parameter B, that is to say the LED voltage, the LED 18*a-f* and thus the entire luminaire 10*a, b* can be dimmed. In other words, each of the LEDs 18*a-f* may emit light 20 of different brightnesses H1, 2 in their respective colour or may be switched off and therefore not emit light 20, that is to say may be dark. The luminaire 10 thus contains LEDs 18*a-f* of different light colours.

The operating parameter B has a respective minimum value Ma-f for each LED 18*a-f*. Only when the operating parameter B, in this case the voltage, reaches or exceeds the minimum value does the respective LED 18*a-f* light up, that is to say emit light 20. Otherwise, it remains dark and does not emit light 20 (see below with respect to FIG. 2 the corresponding ratios for the LEDs 18*a-c*).

The control signal 14 is a PWM signal whose different duty cycles represent different dimming values D for the luminaires 10 or LEDs 18. A duty cycle of zero is a switch-off value A of the control signal 14. In this case, the LEDs 18 should not light up, that is to say should not emit light 20. Otherwise, different duty cycles greater than zero represent certain dimming values D for the luminaires 10 at which said light 20 should emit different brightnesses H. For example, the dimming value D1 corresponds to a duty cycle of 10%, the dimming value D2 corresponds to a duty cycle of 20%, etc. The respective associated brightness H1 is the lowest brightness, H2 is a higher brightness, etc. The dimming value D1 is therefore the darkest or lowest dimming value at which light 20 of the lowest brightness H1 is to be emitted. The dimming values D1, 2, etc. and the switch-off value A are control values S in the form of PWM values of the control signal 14 in the form of a PWM signal.

The luminaire 10 contains a control unit 22. Said control unit in turn contains an assignment rule 24. Each of the control values S is assigned a specific value of the operating parameter B based on the assignment rule 24. In the example, each PWM value (switch-off value A, dimming value D1, 2, etc.) is assigned a specific voltage at each LED 18*a-f*. According to the invention, the assignment rule 24 is calculated such that the minimum value Ma-f of the operating parameter B for each of the LEDs 18*a-f* is at least reached for all of the dimming values D1, 2, etc. This ensures that all of the LEDs 18*a-f* each also reliably light up, that is to say they actually emit light 20, if they are controlled with a relevant dimming value D1, 2, etc.

In order to achieve this, in the present case the assignment rule 24 is stored in the luminaire 10 so as to be able to be changed in order specifically that the assignment rule 24 can be adapted to respective different or individual minimum values Ma-f for each of the LEDs 18*a-f*.

The luminaire 10 contains a memory 26. A correction value Ka-f, which is taken into account in the assignment provision 24, is stored in the memory 26 for each of the LEDs 18*a-f*. The correction value Ka-f is determined individually for each of the LEDs 18*a-f* and is calculated in conjunction with the remaining assignment rule 24 in such a way that the respective minimum value Ma-f of the operating parameter B for the LEDs 18*a-f* is at least reached at each of the dimming values D1, 2, etc., that is to say reached or exceeded, so that these actually emit light 20. The memory 26 is a non-volatile memory.

The correction values Ka-f are taken into account in the assignment rule 24 as follows: The assignment rule 24 contains a constant rule 28 and a correction rule 30. The constant rule 28 determines an intermediate value Z of the operating parameter B from the control value S. The correction rule 30 is in this case additively connected downstream of the constant rule 28 and determines the operating parameter B from the intermediate value Z. The correction values Ka-f flow via the correction rule 30 into the assignment rule 24 and are additive correction offsets in this case. In an alternative embodiment which is not shown, there are multiplicative correction factors. A correction offset of zero therefore does not affect an intermediate value Z of the operating parameter B determined by the constant rule 28 from the control value S, the same as a correction factor of 1. In the following text, the invention is explained only for correction offsets, but also applies analogously to correction factors.

Figure 2:
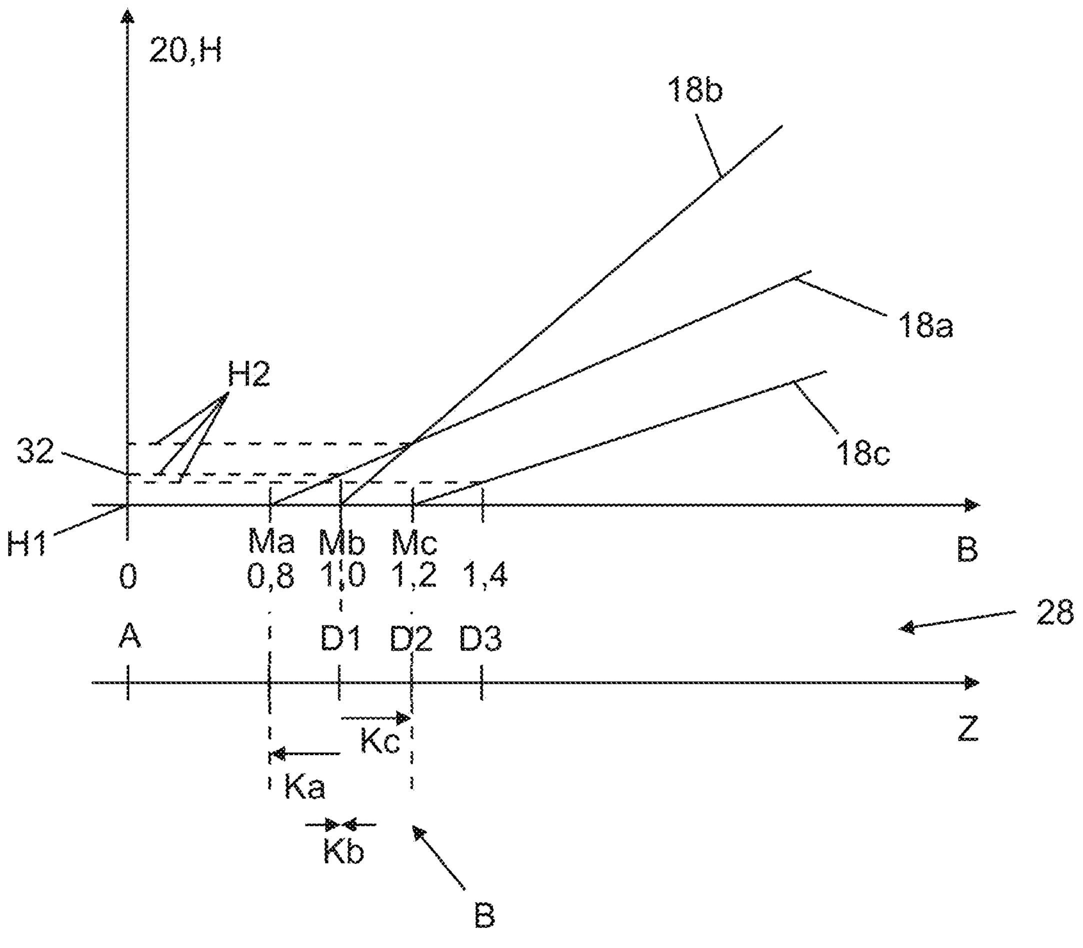
FIG. 2 shows electrical characteristics of the LEDs and relationships with the assignment rule from FIG. 1.

FIG. 2 shows how the individual LEDs 18*a-c* react with the emission of light 20 of a certain brightness H on behalf of the LEDs 18*a-f* to the operating parameter B, in this case the input voltage. The LED 18*a* emits light from a voltage of 0.8 V, the LED 18*b* emits lights from a voltage of 1.0 V and the LED 18*c* emits light from a voltage of 1.2 V. FIG. 2 also shows how the constant rule 28 assigns the voltage 0 V to the switch-off value A as intermediate value Z, the voltage 1.0 V to the dimming value D1, the voltage 1.2 V to the dimming value D2 and the voltage 1.4 V to the dimming value D3, etc. Therefore, if the LEDs 18*a-c* were controlled with the dimming value D1 or the intermediate value Z as operating parameter B based on the constant rule 28, the LEDs 18*a, b* in the luminaire 10*a* would light up, but the LED 18*c* would not, since the minimum value Mc thereof of 1.2 V would not be reached. The LED 18*a* would also begin to light up with an undesirably high brightness 32 at the "darkest" dimming level of the dimming value D1.

Therefore, the correction values Ka-c are stored in the memory 26 individually for each of the LEDs 18*a-c* as follows: the correction value Ka is −0.2 V, the correction value Kb is 0 V and the correction value Kc+0.2 V. According to the correction rule 30 for the LED 18*a*, the value of the operating parameter B of 0.8 V is therefore assigned to the dimming value D1 (1.0 V as intermediate value Z of the constant rule 28), the value of 1.0 V is assigned to the LED 18*b* unchanged and the modified or corrected value of 1.2 V is assigned to the LED 18*c*. The LEDs 18*a-c* are therefore controlled with their lowest possible switch-on voltages 0.8 V, 1.0 V and 1.2 V at the dimming level/dimming value D1 and actually begin to light up with their lowest possible brightness H1 at this dimming value D1 (symbolically still shown in FIG. 2 at brightness H of "zero"). At the dimming value D2, the LEDs 18*a-c* are now controlled with 1.0 V, 1.2 V and 1.4 V voltage as operating parameter B and therefore light up at their desired brightness H2.

The correction values Ka-f remain constant for all further dimming values D1, 2, etc.

The assignment rule 24 is thus calculated such that, at the dimming value D1, which corresponds to the lowest brightness H1 of the respective LED 18*a-f*, the minimum value Ma-f is just reached, that is to say the respective switch-on threshold of the respective LED 18*a-f*. The assignment rule 24 is consistent for all of the LEDs 18 of the luminaires 10 of the same light colour. This means that the correction value Ka applies to all red LEDs, the correction value Kb applies to all green LEDs and the correction value Kc applies to all blue LEDs in all of the luminaires 10.

The assignment rule 24 and in this case the correction values Ka-c were determined prior to commissioning of the luminaires 10 by means of a visual test representative of the respective LEDs 18*a-f*, in an alternative embodiment by means of a measuring device, and stored accordingly in the memory 26 after this determination.

LIST OF REFERENCE SIGNS

2 Passenger cabin
4 Passenger aircraft
6 Luminaire arrangement

8 Light control system
10*a, b* Luminaire
12 Control line
14 Control signal
16 Control input
18*a-f* LED
20 Light
22 Control unit
24 Assignment rule
26 Storage unit
28 Constant rule
30 Correction rule
32 Brightness (undesirable)
B Operating parameter
H1, 2 Brightness
Ma-f Minimum value
A Switch-off value
D1, 2 Dimming value
S Control value
Ka-f Correction value
Z Intermediate value

What is claimed is:

1. A luminaire for a passenger cabin of a passenger aircraft, comprising at least one LED having an operating parameter (B), with the LED being able to be dimmed based on a change in said operating parameter, wherein each of the LEDs is assigned a minimum value (Ma-f) of the operating parameter (B) from which the LED lights up, comprising a control input for receiving an as-intended control signal for the luminaire, wherein the control signal has, in addition to a switch-off value (A), at least two different dimming values (D1, 2) as control values(S), which correspond to respective different brightnesses (H1, 2) of the LEDs, comprising a control unit containing an assignment rule for the LEDs, wherein each of the control values(S) is assigned a specific value of the operating parameter (B) of each of the LEDs based on the assignment rule, wherein the assignment rule is calculated such that the minimum value (Ma-f) of the operating parameter (B) for each of the LEDs is at least reached for each of the dimming values (D1, 2), wherein the operating parameter is a supply voltage for the LED.

2. The luminaire according to claim 1, wherein the assignment rule is stored in the luminaire so as to be able to be changed in such a way that the assignment rule can be adapted to different minimum values (Ma-f).

3. The luminaire according to claim 2, wherein the assignment rule is calculated such that the minimum value (Ma-f) in the operating parameter (B) is just reached for the dimming value (D1, 2) that corresponds to the lowest brightness (H1, 2) of the LEDs.

4. The luminaire according to claim 1, wherein the control signal is a PWM signal.

5. The luminaire according to claim 1, wherein the luminaire contains a memory containing for the LEDs a correction value (Ka-f) taken into account in the assignment rule, said correction value being calculated in conjunction with the rest of the assignment rule such that the minimum value (Ma-f) of the operating parameter (B) for the LEDs is at least reached for each of the dimming values (D1, 2).

6. The luminaire according to claim 5, wherein a correction value (Ka-f) is available in the memory for all of the LEDs of the luminaire.

7. The luminaire according to claim 5, wherein the memory is a non-volatile memory.

8. The luminaire according to claim 5, wherein the assignment rule contains a constant rule and a multiplicative or additive correction rule upstream or downstream of the constant rule, and the correction value (Ka-f) is an additive correction offset or multiplicative correction factor in the correction rule for the constant rule.

9. The luminaire according to claim 5, wherein the correction value (Ka-f) is constant for at least two of the dimming values (D1, 2).

10. The luminaire according to claim 1, wherein the luminaire contains LEDs of different light colours.

11. The luminaire according to claim 10, wherein the assignment rule) is consistent for all of the LEDs of the luminaire of the same light colour.

12. The luminaire according to claim 1, wherein the assignment rule is determined by means of a visual test representative of the respective LED or by means of a measuring device.

13. A luminaire arrangement for a passenger cabin of a passenger aircraft, comprising at least one luminaire according to claim 1, and comprising a light control system connected to the control input and set up to generate the as-intended control signal.

* * * * *